US012723987B2

(12) United States Patent
Kuijpers

(10) Patent No.: US 12,723,987 B2
(45) Date of Patent: Sep. 1, 2026

(54) CHROMIUM VI TEST

(71) Applicant: MATINSPIRED B.V., Rijen (NL)

(72) Inventor: Niels Kuijpers, Rijen (NL)

(73) Assignee: Matinspired B.V., Rijen (NL)

( * ) Notice: Subject to any disclaimer, the term of this patent is extended or adjusted under 35 U.S.C. 154(b) by 922 days.

(21) Appl. No.: 17/995,911

(22) PCT Filed: Apr. 1, 2021

(86) PCT No.: PCT/NL2021/050214
§ 371 (c)(1),
(2) Date: Oct. 10, 2022

(87) PCT Pub. No.: WO2021/210975
PCT Pub. Date: Oct. 21, 2021

(65) Prior Publication Data

US 2023/0194434 A1 Jun. 22, 2023

(30) Foreign Application Priority Data

Apr. 15, 2020 (NL) ..................................... 2025350

(51) Int. Cl.
*G01N 21/80* (2006.01)
*G01N 31/22* (2006.01)

(52) U.S. Cl.
CPC ........... *G01N 21/80* (2013.01); *G01N 31/221* (2013.01)

(58) Field of Classification Search
None
See application file for complete search history.

(56) References Cited

U.S. PATENT DOCUMENTS

| | | | | |
|---|---|---|---|---|
| 5,550,061 | A | 8/1996 | Stone | |
| 9,310,310 | B2 | 4/2016 | Gozum | |
| 2005/0227369 | A1* | 10/2005 | Richardson | G01N 33/2876 422/400 |
| 2011/0008898 | A1* | 1/2011 | Yamauchi | G01N 31/22 436/83 |
| 2013/0052743 | A1* | 2/2013 | Gozum | G01N 21/78 436/83 |
| 2019/0277767 | A1* | 9/2019 | Dhawan | G01N 21/255 |
| 2020/0003698 | A1* | 1/2020 | Lu | G06V 20/10 |
| 2020/0064271 | A1* | 2/2020 | Park | G01J 1/44 |

FOREIGN PATENT DOCUMENTS

| | | | |
|---|---|---|---|
| EP | 0097904 | A1 | 1/1984 |
| JP | H05273193 | A | 10/1993 |
| JP | 2015083971 | A | 4/2015 |
| WO | WO 2006112827 | A1 | 10/2006 |

OTHER PUBLICATIONS

International Search Report, mailed Jul. 8, 2021, for International Application No. PCT/NL2021/050214, 4 pages.

* cited by examiner

*Primary Examiner* — Lore R Jarrett
(74) *Attorney, Agent, or Firm* — Seed IP Law Group LLP

(57) ABSTRACT

The present invention is in the field of chromium VI test, a chromium VI tester, a test kit comprising said chromium VI tester, and in particular to identify low amounts of chromium VI, such as in coatings and paints, which low amounts may form a health risk and may be toxic.

11 Claims, 2 Drawing Sheets

Fig. 2g
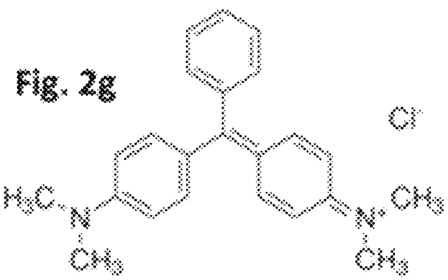
Fig. 2h
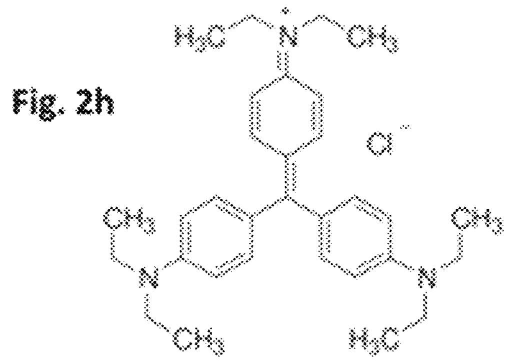
Fig. 2i
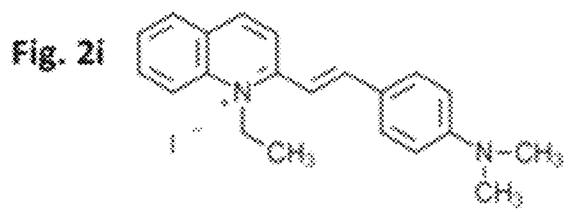
Fig. 2j
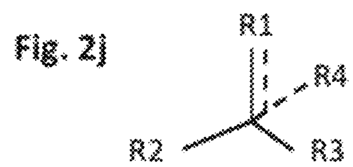
Fig. 3a
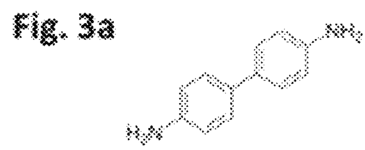
Fig. 3b
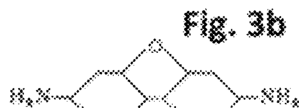
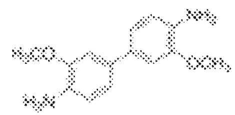
Fig. 3c
Fig. 3d
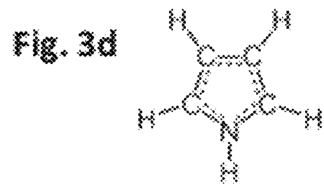
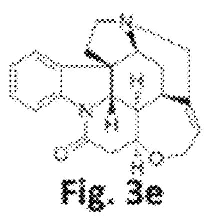
Fig. 3e
Fig. 3f
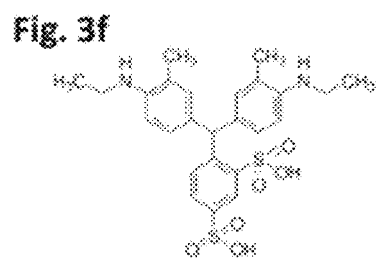
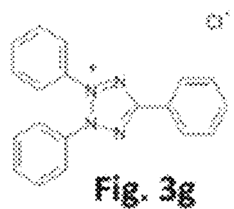
Fig. 3g

CHROMIUM VI TEST

RELATED APPLICATIONS

This application is a national entry of PCT International Patent Application No. PCT/NL2021/050214, filed Apr. 1, 2021, in the name of "MATINSPIRED B.V." [NL], which PCT application claims the benefit of priority of Netherlands Patent Application Serial No. 2025350, filed Apr. 15, 2020, in the name of "MATINSPIRED B.V." [NL]. The entire contents of the above-referenced applications and of all priority documents referenced in the Application Data Sheet filed herewith are hereby incorporated by reference for all purposes.

FIELD OF THE INVENTION

The present invention is in the field of chromium VI test, a chromium VI tester, a test kit comprising said chromium VI tester, and in particular to identify low amounts of chromium VI, such as in coatings and paints, which low amounts may form a health risk and may be toxic.

BACKGROUND OF THE INVENTION

Hexavalent chromium (chromium(VI), Cr(VI), chromium 6) relates to chromium in the +6-oxidation state. Hexavalent chromium or compounds thereof may be present in chromium tri-oxide, in various chrome salts, such as chromate and dichromate, in textile dyes, wood preservation products, anti-corrosion products, and chromate conversion coatings. Industrial uses of hexavalent chromium compounds include chromate pigments in dyes, paints, inks, and plastics; chromates added as anticorrosive agents to paints, primers, and other surface coatings; and chromic acid electroplated onto metal parts to provide a decorative or protective coating.

Chromium VI is toxic and most likely may cause cancers. Therefore in 1991, in the USA, the maximum contaminant level (MCL) for chromium exposure was set based on potential of "adverse dermatological effects" related to long-term chromium exposure to 100 ppb (or 0.1 ppm) in drinking water. Likewise, the EPA came to the conclusion that chromium was associated with various health issues.

Chromium VI can be present in air, for example after spraying paints or by sanding paint layers. Inhalation of these airborne chromium VI is a major health concern. Therefore, the Occupation Safety and Health Administration has established a permissible exposure limit of 5 $\mu g/m^3$ chromium VI for an 8-hour time weighted average.

No maximum chromium-6 concentration was found for chromium-6 paint layers yet. Some maximum concentration of solid materials were found; RoHS Directive 2011/65/EU on the restriction of the use of certain hazardous substances in electronical and electronic equipment, notes that the maximum Chromium VI concentration of homogeneous materials is 1000 ppm (0.1 weight %). The European Directive 2019/48/EG for the safety of toys is more strict and is 0.02 ppm.

Chromium VI is in particular an issue when refurbishing military equipment. For instance, the U.S. Army relied heavily on hexavalent chromium compounds to protect its vehicles, equipment, aviation and missile systems from corrosion. The wash primer was sprayed as a pretreatment and protective layer on bare metal, and subsequently the equipment was painted by a chromium VI primer layer.

Chromium VI is difficult to determine. When present in a solution test kits are available, but these do no function for determining presence of chromium VI incorporated in another, typically solid, material, such as on surfaces.

Some documents recite indicator materials. For instance, WO 2006/112827 A recites a method to analyse the condition of a functional fluid comprising: (1) obtaining a sample of the used fluid; (2) placing the sample of the fluid to a test medium; (3) reacting the fluid with an indicator in the test medium; (4) analysing visually the results of the reactor resulting in the determination of the condition of the fluid. Further an apparatus for analysing functional fluids is disclosed in the form of a test medium consisting of an absorbent or non-absorbent material which has been treated with a chemical indicator, marker substance or a developer or detector reagent upon which a sample of the fluid to be tested is placed. The components in the treated test medium react with components in the test fluid providing a visual indication, for example a colour change, to judge the condition, the presence of a marker substance or another parameter of the fluid. U.S. Pat. No. 9,310,310 B2 recites a flowable dry powder composition comprising a mixture of diphenyl carbazide particles and glass bubbles; kits containing such compositions; methods of filling containers with such compositions; and, methods of using such compositions in the detecting of hexavalent chromium.

It is therefore an object of the present invention to provide an improved yet simple Chromium VI tester, without jeopardizing functionality and advantages.

SUMMARY OF THE INVENTION

The present invention relates to an improved chromium VI-tester, in particular suited for determining presence or absence thereof in a surface, comprising a volume of fluid absorbing material, in the fluid absorbing material a pH-indicator, i.e. an amount of chemical functioning as pH-indicator, wherein the pH indicator has a color in neutral form, and no color or a less intense color (e.g. <20% of an initial intensity, preferably <10% of the initial intensity, such as <1%) under acidic conditions, that is the pH-indicator being discolors, typically being in ionic form, i.e. the fluid absorbing material appears to be colorless, and in the fluid absorbing material a chromium VI-indicator, i.e. an amount of chemical functioning as chrome-VI-indicator, wherein the chromium VI-indicator has a color in the presence of chromium VI, and no color in absence of chromium VI, i.e. the fluid absorbing material appears to be colorless. The pH-indicator may also relate to a chemical compound that is broken down to smaller compounds under acidic conditions. Therewith the present tester provides a sensitive and yet simple tester for establishing presence or absence of Chrome-VI, even in low concentrations, such as above 10 ppm (0.001 weight %). With the simple test it is easy to determine of a safe and non-toxic environment exists, such as for human beings subsequently treating a tested surface, such as by polishing or abrading, such as when using sandpaper.

In a second aspect the present invention relates to a kit, typically a kit of parts, for testing presence of chromium VI comprising at least one chromium VI tester according to the invention, a container for providing fluid drops of acid, wherein the acid is in pure or diluted form, such as diluted in water, wherein the acid has a pH of <5, preferably pH<3, more preferably a pH<1, and optionally a data sheet, instruction, and a safety sheet. The acid may be selected from acetic acid, sulphuric acid, phosphoric acid, suitable carboxylic acids, HCl, typically in diluted form, such as <40%, typically <10%, and combinations thereof. Also, acid in combination with solvents, such as acetone and ethyl alcohol, methyl alcohol is possible. The chromium VI tester and container may also be combined, for example in a tester on a small tube containing the liquid. Likewise, a container may be provided comprising a swab and liquid, wherein the container may be broken before application, releasing the liquid to the swab.

Measurements are typically carried out at ambient conditions, i.e. at about 20° C., and at a pressure of about 100 kPa. For measurements identified typically any measurement technique or measurement tool can be used, having the indicated accuracy. For instance for the pH any Mettler Toledo can be used, for a mass any Mettler Toledo can be used, likewise for a volume any calibrated pipette or calibrated cylinder can be used, etc. These tools are typically readily available in any laboratory. Measurements do not require any further skills typically.

In a third aspect the present invention relates to a method of testing presence or absence of chromium VI comprising, providing a surface potentially comprising chromium VI, such as a coating surface or a paint surface, optionally pre-treating said surface, such as by abrasion, by cutting, by cleaning, providing at least one drop of acid to the chromium VI tester according to the invention, preferably lowering the pH to <3, rubbing the acidic chromium VI tester over said surface, and determining coloration of the tester thereby identifying presence or absence of chromium VI. Typically, when the pH is higher than 3, the chromium-6 in the paint layer does almost not dissolve, and therefore there is no visual or only a slightly visible purple coloration present.

In a fourth aspect the present invention relates to a method of producing a chromium VI tester according to the invention, comprising providing a volume of fluid absorbing material, providing the pH-indicator dissolved in a first solvent, adding pH-indicator dissolved in a first solvent to the fluid absorbing material, such as by drops, and providing the chromium VI-indicator dissolved in a second solvent, adding chromium VI-indicator dissolved in the second solvent to the fluid absorbing material, such as by drops, and removing the first and second solvent, such as by evaporation.

Thereby the present invention provides a solution to one or more of the above-mentioned problems.

Advantages of the present description are detailed throughout the description.

DETAILED DESCRIPTION OF THE INVENTION

The present invention relates in a first aspect to a chromium VI-tester according to claim 1.

In an exemplary embodiment of the present chromium VI tester the fluid absorbing material may be selected from cotton, paper, cellulose comprising material, polymer comprising material, such as acrylate polymers, sponge, fluff pulp, starch, polysaccharides, proteins, and combinations thereof.

In an exemplary embodiment of the present chromium VI tester the fluid absorbing material may be provided on a carrier, such as a rod.

In an exemplary embodiment of the present chromium VI tester the volume of fluid absorbing material may be 1-1000 $mm^3$, preferably 10-500 $mm^3$, such as 50-300 $mm^3$.

In an exemplary embodiment of the present chromium VI tester the pH indicator may be provided in an amount of 0.01-10 $mg/cm^3$, preferably 0.1-50 $mg/cm^3$, more preferably 0.5-10 $mg/cm^3$, such as 1-5 $mg/cm^3$.

In an exemplary embodiment of the present chromium VI tester the pH indicator may be selected from organic indicators, preferably indicators with structural formula

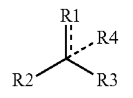

wherein each of R1, R2, and R3, each independently comprise at least one aromatic hydrocarbon moiety, such as benzene and naphthalene, and wherein each of R1, R2, and R3, each independently, comprise 0-2 sulfonate groups, and/or, each independently, comprise 0-2 tertiary ammine groups, preferably wherein R1 and R2 comprise 0-1 sulfonate groups and wherein R2 comprise 1-2 sulfonate groups, such as E131, E133, E142, ethyl violet, methyl violet, malachite green, bromophenol blue, and methyl thymol blue. R4 may be selected from a $C_1$-$C_5$ alkane, H, or may be absent, in which latter case a double bond is present (dashed line). An alternative is quinaldine red.

In an exemplary embodiment of the present chromium VI tester the pH indicator may be selected from sulfur comprising silicates $Si_nO_{4n}S_j^{m-}$, wherein n∈[5-8], j∈[3-6], and m∈[5-20], typically having at least one $S^{3-}$ moiety, and optionally at least one $M^{3+}$ counter cation, typically 3-9 cations, wherein M may be selected from Group 15 metals, such as Al, and Fe, and wherein the charge m− is preferably compensated by monovalent cations, such as $Na^+$, $K^+$, and $NH_4^+$.

In an exemplary embodiment of the present chromium VI tester the pH indicator has a spectral absorbance of <10%, such as <5%. As a reference the wavelength with the respective highest peak may be selected to determine the absorbance.

In an exemplary embodiment of the present chromium VI tester the chromium VI-indicator may be provided in an amount of 0.01-200 $mg/cm^3$, preferably 0.1-50 $mg/cm^3$.

In an exemplary embodiment of the present chromium VI tester the chromium VI-indicator may be selected from 1,5-Diphenylcarbohydrazide, Penta methylene-bis triphenyl phosphonium, triphenyltrazolium chloride, xylene cyanole, p-amino-N,N-diethylaniline, benzooxazol, benzothiazole, dimethylindocarboxyanine, dimethylindodicarboxyanine, p-amino-N,N-diethylaniline (change to red), benzidine (change to blue), 2,7-diaminodiphenylene oxide (change to blue), o-Dianisidine (change to red), indigo carmine, 2,2'-dipyridyl, KI, $KIO_3$, Pyrrole (change to blue), Strychnine (change to blue violet/red), 3f Leuco xylene cyanole FF (change to blue), and nitro blue tetrazolon chloride.

In an exemplary embodiment of the present method of producing a chromium VI tester 0.1-3 ml of first solvent may be added.

In an exemplary embodiment of the present chromium VI test method 1-10 ml of second solvent may be added.

In an exemplary embodiment of the present method of producing a chromium VI tester the first solvent may comprise 0.01-10 mg pH indicator/$cm^3$ first solvent, preferably 0.1-3 $mg/cm^3$ pH indicator/$cm^3$ first solvent.

In an exemplary embodiment of the present method of producing a chromium VI tester the second solvent may comprise 0.01-200 mg chromium VI indicator per $cm^3$ second solvent, preferably 0.1-50 $mg/cm^3$, such as 0.5-3 $mg/cm^3$.

The first and second solvent may be the same solvent.

For instance, the

In an exemplary embodiment of the present method of producing a chromium VI tester the first and second solvent may each individually be selected from alcohols, such as ethanol, methanol, and isopropanol, from acetone, and from water.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

SUMMARY OF FIGURES

FIG. 1 shows a chromium VI test.

FIGS. 2*a*-2*i* show exemplary pH indicators and FIG. 2*j* a general chemical structural formula thereof.

FIGS. 3*a*-3*g* show exemplary Cr-VI indicators

DETAILED DESCRIPTION OF THE FIGURES

Figures 1, 2A, 2B, 2C, 2D, 2E, 2F:
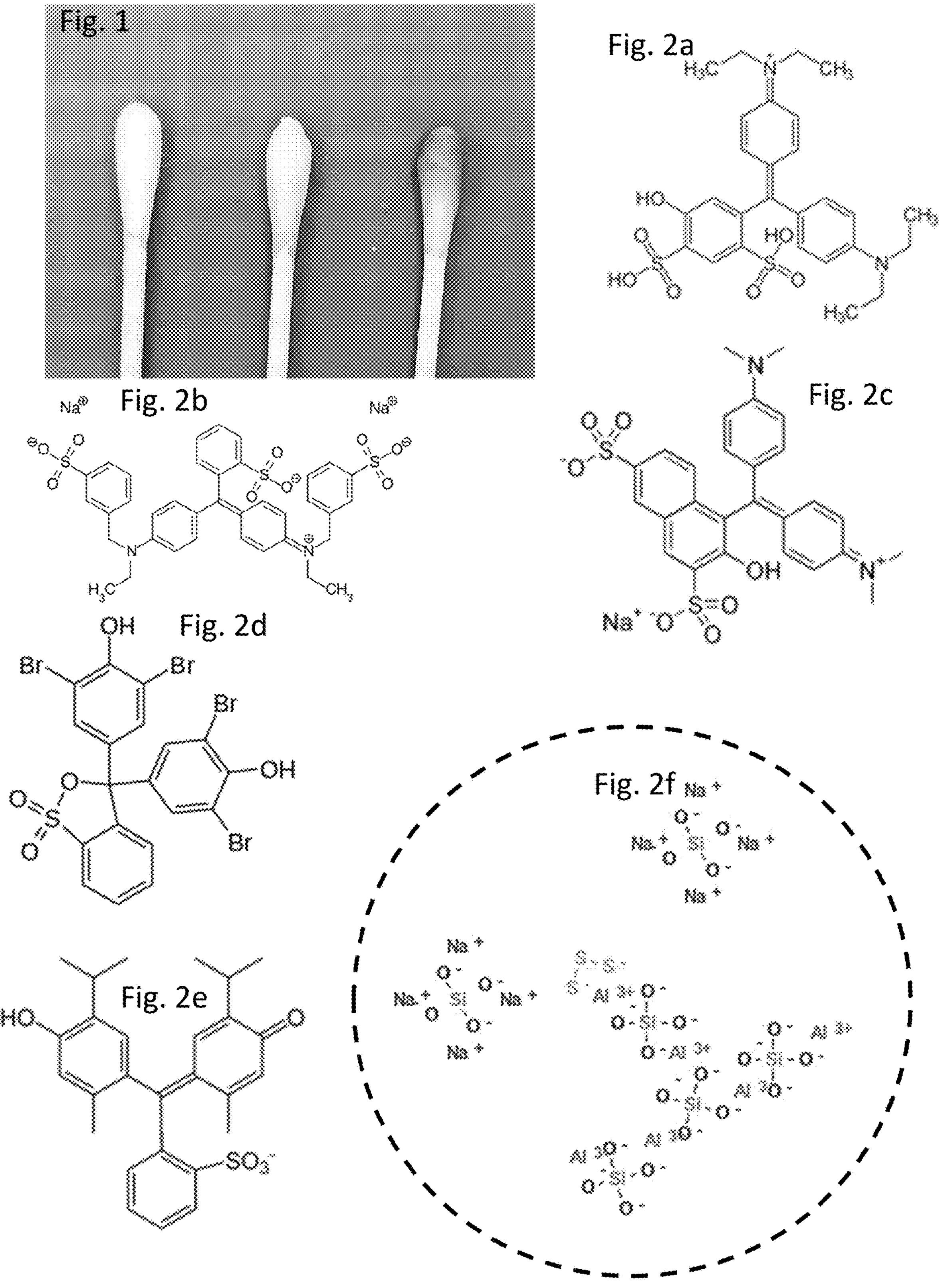

FIG. 1 shows a chromium VI test. FIG. 1A: cotton swab (or cotton bud) with blue dye and indicator. B: moistened head of cotton wool with an acid, causing the color of the pH-indicator to fade. C: Moistened swab rubbed on a surface where chromium-6 was present, causing the head to turn purple, as the chromium VI indicator changes color.

FIGS. 2*a-e* show exemplary pH indicators and FIG. 2*f* a general chemical structural formula thereof. FIG. 2*a* shows E131 en E131 lake Patent blue V (CAS Number 3536-49-0), FIG. 2*b* shows E133

Brilliant Blue FCF (Blue 1) (CAS 3844-45-9), FIG. 2*c* shows E142 (CAS 3087-16-9), FIG. 2*d* shows Bromophenol Blue (CAS 115-39-9), FIG. 2*e* shows Methyl thymol blue (CAS 3778-22-1), FIG. 2*f* shows pigment blue 29 (CAS 57455-37-5), FIG. 2*g* shows malachite green (CAS number 569-64-2, chlorite salt), FIG. 2*h* shows ethyl violet, analogue to methyl violet (CAS 8004-87-3), which may comprise, each individually, an alkane moiety on each N-end-group, and FIG. 2*i* shows quinaldine red (CAS 117-92-0). FIG. 2*j* shows generic pH-indicators, wherein each of R1, R2, and R3, each independently comprise at least one aromatic hydrocarbon moiety, such as benzene and naphthalene, and wherein each of R1, R2, and R3, each independently, comprise 0-2 sulfonate groups, and/or, each independently, comprise 0-2 tertiary ammine groups, preferably wherein R1 and R2 comprise 0-1 sulfonate groups and wherein R2 comprise 1-2 sulfonate groups, such as E131, E133, E142, ethyl violet, methyl violet, malachite green, bromophenol blue, and methyl thymol blue. R4 may be selected from a $C_1$-$C_5$ alkane, H, or may be absent, in which latter case a double bond is present (dashed line).

Examples/Experiments

The invention although described in detailed explanatory context may be best understood in conjunction with the accompanying examples and figures.

Experimental

Background chromium-6 (or chrome-VI) test, such as for paints, coatings, and surfaces.

Test rods, such as the cotton swabs above, can be produced by adding an indicator in the cotton head of a cotton swab. This swab can then be used to detect chromium-6; the swab head is moistened with an acid, such as diluted sulphuric acid, and then rubbed over a layer of paint or another surface that may contain chromium-6. A chromium-6 indicator in combination with an acid reacts with the dissolved chromium-6 leading to a purple discoloration.

So in the present chromium VI tester a use of an additional dye in addition to a chromium VI indicator (for the swab head of the wadding rods) that fades or discolors (to a light color or no color at all) when the cotton swabs are moistened (dripped) with an acid, such as sulphuric acid. The fading may be due to the fact, for example, that the dye is (intentionally) not stable, and therefore breaks down at high acidity. But these can also be dyes that don't give a color, or a lighter color when the pH changes (i.e. a pH indicator).

Treatment of the cotton swabs with 'fading' dyes has several advantages:

(1) During production, the color of the cotton swabs allows us to clearly see which cotton wool rods have been treated. This prevents mistakes: the white untreated cotton wool rods cannot be confused with the treated rods. Such is also subject to government regulations.

(2) Cosmetic products, such as cotton swabs, may not legally be treated with chemicals without this being clearly visible.

(3) A customer can clearly see that the cotton wool bars have been treated. She will therefore not think that she can use untreated cotton swabs (white cotton swabs) for the test.

(4) A customer can clearly see if a cotton swab is sufficiently moistened with sulphuric acid: only in this case the blue color will disappear.

(5) After moistening with e.g. sulphuric acid, the color becomes light (i.e. no longer blue) so that any purple discoloration due to presence of chromium-6 becomes clearly visible during the test. This will result in a lower detection limit compared to a cotton swab treated with a dye that does not fade. The detection limit (just visible coloration by bare eye) is at present about 100 ppm (0.01 weight % chromium VI in a paint layer) for a swab size of ap-proximately 0.2 $cm^3$. At this detection limit approximately 0.1 μg chromium VI is dissolved. With smaller swab sizes lower amounts of chromium VI can be detected, such as 10 ppm.

(6) The color of the cotton swab may camouflage the light-purple discoloration that occurs over time when cotton wool rods are stored longer in a bag. With the blue discolored cotton wool rods this (innocent) discoloration will not/less stand out and therefore will not cause discussion. The shelf life can therefore be extended.

Examples of Dyes

These are typically pH-indicators. The chemical (acid-base) reaction involved can be represented by:

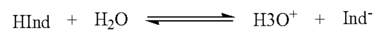

Wherein HInd has a different color than $Ind^-$ (the conjugated form). In the present application HInd has a light color or is colorless. This is obtained with the acid (moist) state of the cotton bud. For the present application, the Ind form preferably has the basic color of the not moistened cotton wool bar (neutral).

A few examples of successful pH indicators are given in FIGS. 2*a-i*, whereas FIG. 2*j* represents a generic chemical structure.

FIG. 3*a* shows benzidine (CAS 92-87-5), 3b 2,7-diamino-diphenylene oxide, 3c o-Dianisidine (CAS 119-90-4), 3d pyrrole (CAS 109-97-7), 3e strychnine (CAS 57-24-9), 3f Leuco xylene cyanole FF (CAS 303-373-0), 3g tetrazolium chloride (CAS 298-96-4).

The invention claimed is:

1. A chromium VI-tester comprising: a fluid absorbing material, in the fluid absorbing material, a pH-indicator, wherein the pH-indicator has a color in neutral form, and no color under acidic conditions, and in the fluid absorbing material, a chromium VI-indicator, wherein the chromium VI-indicator has a color in the presence of chromium VI, and no color in absence of chromium VI, wherein the pH-indicator color in neutral form is different from the chromium VI-indicator color in the presence of chromium VI, further comprising a container for providing fluid drops of acid, wherein the acid has a pH<3.

2. The chromium VI-tester according to claim 1, wherein the fluid absorbing material is selected from cotton, paper, cellulose comprising material, polymer comprising material, including acrylate polymers, sponge, fluff pulp, starch, polysaccharides, proteins, and combinations thereof.

3. The chromium VI-tester according to claim 1, wherein the fluid absorbing material is provided on a carrier.

4. The chromium VI-tester according to claim 1, wherein the volume of fluid absorbing material is 1-1000 $mm^3$.

5. The chromium VI-tester according to claim 1, wherein the pH-indicator is provided in an amount of 0.01-10 $mg/cm^3$.

6. The chromium VI-tester according to claim 1, wherein the pH-indicator is selected from organic indicators, including indicators with structural formula

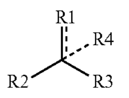

wherein each of R1, R2, and R3, each independently comprise at least one aromatic hydrocarbon moiety, and wherein each of R1, R2, and R3, each independently, comprise 0-2 sulfonate groups, and each independently, comprise 0-2 tertiary ammine groups, wherein R1 and R2 comprise 0-1 sulfonate groups and wherein R2 comprise 1-2 sulfonate groups, including E131, E133, E142, ethyl violet, methyl violet, malachite green, bromophenol blue, and methyl thymol blue, wherein R4 is selected from a $C_1$-$C_5$ alkane, H, or is absent, in which latter case a double bond is present, and from sulfur comprising silicates $Si_nO_{4n}S_j^{m-}$, wherein n∈[5-8], j∈[3-6], and m∈[5-20], and from quinaldine red, and wherein the pH-indicator has an absorbance of <10%.

7. The chromium VI-tester according to claim 6, wherein the chromium VI-indicator is provided in an amount of 0.01-200 $mg/cm^3$.

8. The chromium VI-tester according to claim 1, wherein the chromium VI-indicator is selected from 1,5-Diphenylcarbazide, pentamethylene-bis triphenylphosphonium, triphenylterazolium chloride and nitrobluetetrazolon chloride.

9. At least one chromium VI-tester according to claim 1, the at least one chromium VI-tester comprising: a fluid absorbing material, in the fluid absorbing material, a pH-indicator, wherein the pH-indicator has a color in neutral form, and no color under acidic conditions, and in the fluid absorbing material, a chromium VI-indicator, wherein the chromium VI-indicator has a color in the presence of chromium VI, and no color in absence of chromium VI.

10. The at least one chromium VI-tester according to claim 9, wherein the container comprises 0.1-20 ml of acid, and wherein the at least one chromium VI-tester is more than two chromium VI-testers.

11. A method of testing presence or absence of chromium VI comprising:

providing a surface potentially comprising chromium VI, wherein the surface is a coating surface or a paint surface, providing at least one drop of acid to the chromium VI-tester according to claim 1, therewith lowering the pH to <3, rubbing the acidic chromium VI-tester over the surface, and determining coloration of the tester thereby identifying presence or absence of chromium VI.

* * * * *